(12) United States Patent
Futaki et al.

(10) Patent No.: US 12,075,428 B2
(45) Date of Patent: Aug. 27, 2024

(54) METHODS AND APPARATUSES FOR CONFIGURING RADIO TERMINAL WITH NUMEROLOGY OF SECOND RAT VIA FIRST RAT

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 17/383,910

(22) Filed: Jul. 23, 2021

(65) Prior Publication Data

US 2021/0352639 A1    Nov. 11, 2021

Related U.S. Application Data

(63) Continuation of application No. 16/984,736, filed on Aug. 4, 2020, now Pat. No. 11,109,369, which is a (Continued)

(30) Foreign Application Priority Data

Jan. 5, 2017    (JP) ................................. 2017-000798

(51) Int. Cl.
*H04W 72/23*    (2023.01)
*H04W 36/00*    (2009.01)
(Continued)

(52) U.S. Cl.
CPC ....... *H04W 72/23* (2023.01); *H04W 36/0069* (2018.08); *H04W 36/14* (2013.01);
(Continued)

(58) Field of Classification Search
CPC . H04W 72/23; H04W 36/0069; H04W 36/14; H04W 84/042; H04W 88/06; H04W 92/20
See application file for complete search history.

(56) References Cited

U.S. PATENT DOCUMENTS

| | | | |
|---|---|---|---|
| 10,038,581 B2 | 7/2018 | Zhang et al. |
| 10,064,217 B2 | 8/2018 | Rajagopal et al. |

(Continued)

FOREIGN PATENT DOCUMENTS

| | | |
|---|---|---|
| CN | 104885550 A | 9/2015 |
| CN | 106063326 A | 10/2016 |

(Continued)

OTHER PUBLICATIONS

Huawei, "Requirements and functionalities of interface between LTE and NR", 3GPP TSG-RAN3 Meeting #92, Nanjing, China, May 23-27, 2016, R3-161138 (Year: 2016).*

(Continued)

*Primary Examiner* — Joseph A Bednash

(57) ABSTRACT

A second RAN node (2) associated with a second RAT sends a radio resource configuration of the second RAT to a radio terminal (3) via a first RAN node (1) associated with a first RAT. The radio resource configuration explicitly or implicitly indicates at least one numerology that is included in multiple numerologies supported by the second RAT and is different from a reference numerology. It is thus, for example, possible to allow a radio terminal to be configured with a numerology of a cell served by a secondary gNB or a target gNB in Inter-RAT Dual Connectivity between E-UTRA and NR and in a handover from E-UTRA to NR.

18 Claims, 10 Drawing Sheets

Related U.S. Application Data continuation of application No. 16/474,870, filed as application No. PCT/JP2017/041835 on Nov. 21, 2017, now Pat. No. 10,980,015.

(51) Int. Cl.
| | |
|---|---|
| H04W 36/14 | (2009.01) |
| H04W 84/04 | (2009.01) |
| H04W 88/06 | (2009.01) |
| H04W 92/20 | (2009.01) |

(52) U.S. Cl.
CPC .......... *H04W 84/042* (2013.01); *H04W 88/06* (2013.01); *H04W 92/20* (2013.01)

(56) References Cited

U.S. PATENT DOCUMENTS

| | | | |
|---|---|---|---|
| 10,117,212 | B2 | 10/2018 | Rune et al. |
| 10,555,280 | B2 | 2/2020 | Takeda et al. |
| 10,630,410 | B2 | 4/2020 | Parkvall et al. |
| 10,727,991 | B2 | 7/2020 | Chen |
| 10,862,643 | B2 | 12/2020 | Doll et al. |
| 2013/0028150 | A1 | 1/2013 | Ma et al. |
| 2014/0192740 | A1 | 7/2014 | Ekpenyong et al. |
| 2016/0309466 | A1 | 10/2016 | Chen et al. |
| 2016/0345224 | A1 | 11/2016 | Agyapong et al. |
| 2016/0352551 | A1 | 12/2016 | Zhang et al. |
| 2018/0115940 | A1 | 4/2018 | Abedini |
| 2018/0249400 | A1 | 8/2018 | Harada et al. |
| 2018/0262233 | A1 | 9/2018 | Laselva et al. |
| 2018/0263048 | A1 | 9/2018 | Ingale et al. |
| 2018/0352468 | A1 | 12/2018 | Futaki et al. |
| 2018/0376439 | A1* | 12/2018 | Urabayashi ....... H04L 27/26136 |
| 2019/0037606 | A1 | 1/2019 | Takeda |
| 2019/0045506 | A1 | 2/2019 | Takeda et al. |
| 2019/0104551 | A1 | 4/2019 | Deenoo et al. |
| 2019/0174554 | A1 | 6/2019 | Deenoo et al. |
| 2019/0208482 | A1 | 7/2019 | Tooher et al. |
| 2019/0342902 | A1 | 11/2019 | Wu |
| 2019/0349906 | A1 | 11/2019 | Futaki et al. |

FOREIGN PATENT DOCUMENTS

| | | |
|---|---|---|
| EP | 2343924 A1 | 7/2011 |
| WO | 2015/050099 A1 | 4/2015 |
| WO | 2015/176934 A1 | 11/2015 |
| WO | 20160130175 A1 | 8/2016 |
| WO | WO 2016/133122 A1 | 8/2016 |
| WO | 20160137532 A1 | 9/2016 |
| WO | 20160208897 A1 | 12/2016 |

OTHER PUBLICATIONS

Qualcomm Incorporated, "Xx interface protocol and option 7 in tight interworking", 3GPP TSG-RAN WG3 Meeting #93bis, Sophia Antipolis, France, Oct. 10-14, 2016, R3-162199 (Year: 2016).*
3GPP TS 36.423 V13.5.0 (Sep. 2016) 3rd Generation Partnership Project; Technical Specification Group Radio Access Network; Evolved Universal Terrestrial Radio Access Network (E-UTRAN); X2 application protocol (X2AP) (Release 13) (Year: 2016).*
Ericsson, "RRC configuration in LTE-NR tight interworking", 3GPP TSG-RAN WG2 #96, Reno, Nevada, USA, Nov. 14-18, 2016, R2-168921 (Year: 2016).*
AU Office Action for AU Application No. 2021282555, dated Nov. 28, 2022.
Huawei, "Procedure of inter-RAT handover without CN change", 3GPP TSG-RAN WG3 Meeting #94, Nov. 14-18, 2016, R3-162952, pp. 1-3.
Ericsson, "UE context handling during inter RAT handover", 3GPP TSG-RAN WG2 #95-bis, Oct. 10-14, 2016, R2-166787, pp. 1-3.
Chinese Office Action for CN Application No. 201780087974.X, dated Sep. 1, 2022 with English Translation.
InterDigital Communications, "MAC Layer Impact of Supporting Different Services", 3GPP TSG-RAN WG2 #96 R2-168468, Nov. 5, 2016.
Japanese Office Action for JP Application No. 2020-121808 dated May 25, 2021 with English Translation.
Huawei, HiSilicon, "Discussion on LTE-NR handover", 3GPP TSG RAN WG2 #96, R2-168570, Nov. 5, 2016, USA.
ASUSTeK, "Impact of multiplexing multiple numerologies on initial access", 3GPP TSG RAN WG1 #87, R1-1612902, Nov. 4, 2016, USA.
Ericsson, "RRM and related control plane aspects for LTE-NR tight-interworking", 3GPP TSG RAN WG2 #96, R2-168293, Nov. 5, 2016, pp. 1 /6-6/6, USA.
U.S. Notice of Allowance dated Dec. 10, 2020, for prior U.S. Appl. No. 16/474,870.
U.S. Office Action dated Dec. 14, 2020, for prior U.S. Appl. No. 16/984,773.
R2-168296, Ericsson, "UE Capability Signalling for Tight Interworking", 3GPP-RAN WG2 Meeting #96bis, Reno, Nevada, Nov. 14-18, 2016.
Examination Report dated Nov. 26, 2020, issued by the Australian Patent Office in counterpart Australian Patent Application No. 2020204215.
International Search Report dated Feb. 9, 2018, in corresponding PCT International Application.
3GPP TR 23.799 V14.0.0 (Dec. 2016), "3$^{rd}$ Generation Partnership Project; Technical Specification Group Services and System Aspects; Study on Architecture for Next Generation System, (Release 14)", pp. 1-522, (Dec. 2016).
3GPP TR 38.801 V1.0.0 (Dec. 2016), "3$^{rd}$ Generation Partnership Project; Technical Specification Group Radio Access Network; Study on New Radio Access Technology; Radio Access Architecture and Interfaces, (Release 14)", pp. 1-72, (Dec. 2016).
3GPP TSG-RAN#96 (Nov. 2016), "QoS and Bearer for DC Between LTE and NR", R2-168400, pp. 1-3, (Nov. 2016).
3GPP TSG-RAN WG2 Meeting #96 (Nov. 2016), "EPC-NR PDCP I: User Plane Aspects", R2-168686, pp. 1-7, (Nov. 2016).
3GPP TR 38.804 V1.4.0 (Nov. 2016), "3$^{rd}$ Generation Partnership Project; Technical Specification Group Radio Access Network; Study on New Radio Access Technology; Radio Interface Protocol Aspects, (Release 14)", pp. 1-30, (Nov. 2016).
3GPP TSG-RAN WG2 Meeting #95 (Aug. 2016), "Carrier Aggregation Between Carriers of Different Air Interface Numerologies", R2-164788, pp. 1-4, (Aug. 2016).
3GPP TSG-RAN WG2 #95 (Aug. 2016), "Aggregation of Carriers in NR", R2-165328, pp. 1-4, (Aug. 2016).
3GPP TSG-RAN WG2 #96 (Nov. 2016), "RRC Configuration in LTE-NR Tight-Interworking", Tdoc R2-168291, pp. 1-4, (Nov. 2016).
3GPP TSG-RAN WG2 Meeting #95bis (Oct. 2016), "Connection Establishment in Multiple Numerology Environment", R2-166934, pp. 1-3, (Oct. 2016).
3GPP TSG-RAN WG2 Meeting #96 (Nov. 2016), "Measurement coordination in LTE/NR tight Interworking", R2-168118, pp. 1-6, (Nov. 2016).
3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN), 3GPP TS 36.300 V14.1.0 (Dec. 2016).
Office Action dated Oct. 8, 2019, issued by the Japanese Patent Office in counterpart Japanese Patent Application No. 2018-560335.
COOLPAD: Discussion on the design for synchronization signal, 3GPP Draft, R1-1609879, Oct. 2016.
SAMSUNG: Initial access procedure to support multiple numerologies in NR, 3GPP Draft, R2-168087, Nov. 2016.
Extended European Search Report dated Nov. 22, 2019, in counterpart European Patent Application No. 17 88 9814.4.
Office Action dated Apr. 14, 2020, issued by the Japanese Patent Office in counterpart Japanese Patent Application No. 2020-023937.
Office Action dated Aug. 25, 2020, issued by the United States Patent and Trademark Office in counterpart U.S. Appl. No. 16/474,870.
3GPP TSG-RAN WG2 #95, Tdoc R2-165344, Ericsson, Specifications for NR, Aug. 22-26, 2016.

(56) References Cited

OTHER PUBLICATIONS

3GPP TSG-RAN WG4 Meeting #80bis, R4-167322, Intel Corporation, Considerations on NR RRM with the multiple numerologies, Oct. 10-14, 2016.
3GPP TSG RAN WG1 Meeting #85, R1-165162, Media Tek Inc., On Numerology for New Radio Access Technoloy, May 23-27, 2016.
3GPP TSG RAN WG1 Meeting #84bis, R1-163224, Ericsson, Feasibility of Mixing Numerology in an OFDM System, Apr. 11-15, 2016.
3GPP TSG RAN WG1 Meeting #87, R1-1611461, Fujitsu, Discussion on PRACH configuration in NR, Nov. 14-18, 2016.
3GPP TSG RAN WG1 Meeting #86bis, R1-1609238, LG Electronics, Discussion on multi-carrier operation between LTE and NR, Oct. 10-14, 2016.
3GPP TSG-RAN WG2 Meeting #96, R2-167582, Huawei, HiSilicon, RRC Support of Multiple Numerologies, Nov. 14-18, 2016.
3GPP TSG RAN WG2 Meeting #96, R2-167841, ZTE, ZTE Microelectronics, Consideration on the transmission of NR RRC Message in LTE/NR tight interworking, Nov. 14-18, 2016.
3GPP TSG-RAN WG2 #96, R2-168091, NTT Docomo, Inc., System Information handling for LTE-NR Dual Connectivity, Nov. 14-18, 2016.
3GPP TSG-RAN WG2 Meeting #96, Tdoc R2-168491, Ericsson, RRC specification evolution, Nov. 14-18, 2016.

\* cited by examiner

METHODS AND APPARATUSES FOR CONFIGURING RADIO TERMINAL WITH NUMEROLOGY OF SECOND RAT VIA FIRST RAT

CROSS-REFERENCE TO RELATED PATENT APPLICATIONS

This application is a continuation of U.S. patent application Ser. No. 16/984,736, filed Aug. 4, 2020, which is a continuation of U.S. patent application Ser. No. 16/474,870, filed Jun. 28, 2019, which issued as U.S. Pat. No. 10,980,015 on Apr. 13, 2021, which is a National Stage Entry of International Application No. PCT/JP2017/041835, filed Nov. 21, 2017, which claims priority from Japanese Patent Application No. 2017-000798, filed Jan. 5, 2017. The entire contents of the above-referenced applications are expressly incorporated herein by reference.

TECHNICAL FIELD

The present disclosure relates to a radio communication system and, in particular, to communication in which a radio terminal simultaneously uses multiple cells of different Radio Access Technologies (RATs) operated by different radio stations.

BACKGROUND ART

The 3rd Generation Partnership Project (3GPP) has started in 2016 the standardization for the fifth generation mobile communication system (5G), i.e., 3GPP Release 14, to make it a commercial reality in 2020 or later, 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and multiple Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with.

In contrast, with regard to the 5G System, it is discussed that although radio bearers may be used in the 5G-RAN, no bearers are used in the 5G-CN or in the interface between the 5G-CN and the NG-RAN (see Non-Patent Literature 1). Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow, in the QoS framework of the 5G system, a PDU flow is identified by a PDU flow ID contained in a header encapsulating a Service Data Unit of a tunnel of a NG3 interface. The NG3 interface is a user plane interface between the 5G-CN and the gNB (i.e., 5G-RAN). Association between a 5G UE and a data network is referred to as a "PDU session". The term "PDU session" corresponds to the term "PDN connection" in LTE and LTE-Advanced. Multiple PDU flows can be configured in one PDU session.

The PDU flow is also referred to as a "QoS flow". The QoS flow is the finest granularity in QoS treatment in the 5G system. User plane traffic having the same NG3 marking value in a PDU session corresponds to a QoS flow. The NG3 marking corresponds to the above-described PDU flow ID, and it is also referred to as a QoS flow ID or a Flow Identification Indicator (FII).

It has also been suggested that the 5G System supports network slicing (see Non Patent Literature 1). Network slicing uses Network Function Virtualization (NFV) and software-defined networking (SDN) techniques and makes it possible to generate multiple virtualized logical networks on a physical network. Each virtualized logical network is referred to as a network slice or a network slice instance, includes logical nodes and functions, and is used for specific traffic and signaling. The 5G-RAN or the 5G-CN or both have a Slice Selection Function (SSF). The SSF selects one or more network slices suitable for a 5G UE based on information provided by at least one of the 5G UE and the 5G-CN.

FIG. 1 shows a basic architecture of the 5G system. A UE establishes one or more Signalling Radio Bearers (SRBs) and one or more Data Radio Bearers (DRBs) with a gNB. The 5G-CN and the gNB establish a control plane interface and a user plane interface for the UE. The control plane interface between the 5G-CN and the gNB (i.e., RAN) is referred to as an NG2 interface or an NG-c interface and is used for transfer of Non-Access Stratum (NAS) information and for transfer of control information (e.g., NG2 AP Information Element) between the 5G-CN and the gNB. The user plane interface between the 5G-CN and the gNB (i.e., RAN) is referred to as an NG3 interface or an NG-u interface and is used for transfer of packets of one or more PDU flows in a PDU session of the UE.

Note that, the architecture shown in FIG. 1 is merely one of the 5G architecture options or deployment scenarios (see Annex J of Non-Patent Literature 1 and see Non-Patent Literature 2). The architecture shown in FIG. 1 is referred to as "Standalone NR (in NextGen System)" or "Option 2". In contrast, FIGS. 2 and 3 show architecture Options 3 and 3A, which are referred to as "Non-standalone NR in EPS". In FIGS. 2 and 3, control interfaces are shown as dashed lines, while user plane interfaces are shown as solid lines. Architecture Options 3 and 3A are Dual connectivity (DC) deployments including E-UTRA as the anchor RAT (or the primary RAT or the master RAT) and NR as a secondary RAT. In Options 3 and 3A, E-UTRA (LTE eNB) and NR (gNB) are connected to the EPC. The NR user plane connection to the EPC goes through the LTE eNB in Option 3, whereas in Option 3A, it passes directly through a user plane interface between the gNB and the EPC.

Non-Patent Literature 3 has suggested that in Architecture Options 3 and 3A, which are DC, architecture where E-UTRA and NR are connected to the EPC, the NR gNB supports the LTE DC functionalities and procedures. Non-Patent Literature 3 has also suggested that in the DC architecture where E-UTRA and NR are connected to the EPC, the NR gNB applies the LTE QoS framework (i.e., bearer based QoS) to the EPC, the LTE eNB and the UE. Further, Non-Patent Literature 3 has suggested the following proposals:

LTE DC procedures (e.g., SeNB addition) are applied when adding NR gNB as secondary node, in which necessary QoS service (i.e., bearer) are configured:

E-UTRAN Radio Access Bearer (E-RAB) is established between EPC and NR gNB for Secondary Cell Group (SCG) bearer option according to LTE;

X2-U is established between LTE eNB and NR gNB for split bearer option according to LTE; and DRB is established between NR gNB and UE according to SCG bearer option or split bearer option according to LTE.

Non-Patent Literature 4 has suggested that there is one-to-one mapping (1:1 mapping) between S1-U and DRB of SCG (i.e., SCG bearer). Non-Patent Literature 4 has also suggested that QoS attributes of EPC are in use for EPS bearers and, accordingly, there is a need to map the QoS parameters used in EPC to the radio bearer parameters used in the NR.

In addition, the NR is expected to use different sets of radio parameters in multiple frequency bands. Each radio parameter set is referred to as "numerology". OFDM numerology for an Orthogonal Frequency Division Multiplexing (OFDM) system includes, for example, subcarrier spacing, system bandwidth. Transmission Time Interval (TTI) length, subframe duration, cyclic prefix length, and symbol duration. The 5G system supports various types of services having different service requirements, including, for example, enhanced Mobile Broad Band (eMBB). Ultra Reliable and Low Latency Communication (URLLC), and M2M communication with a large number of connections (e.g., massive Machine Type Communication (mMTC)). Numerology selection depends on service requirements.

The UE and the NR gNB in the 5G system support aggregation of multiple NR carriers with different numerologies. The 3GPP discusses achievement of aggregation of multiple NR carriers with different numerologies by lower layer aggregation, such as the existing LTE Carrier Aggregation (CA), or higher layer aggregation, such as the existing Dual Connectivity (see, for example, Non-Patent Literature 5 to 7).

CITATION LIST

Non Patent Literature

[Non-Patent Literature 1] 3GPP TR 23.799 V14.0.0 (2016-12) "3rd Generation Partnership Project; Technical Specification Group Services and System Aspects; Study on Architecture for Next Generation System (Release 14)", December 2016

[Non-Patent Literature 2] 3GPP TR 38.801 V1.0.0 (2016-12) "3rd Generation Partnership Project; Technical Specification Group Radio Access Network; Study on New Radio Access Technology; Radio Access Architecture and Interfaces (Release 14)". December 2016

[Non-Patent Literature 3] 3GPP R2-168400, NTT DOCOMO. INC., "QoS and bearer for DC between LTE and NR", 3GPP TSG RAN WG2 Meeting #96, Reno. USA. 14-18 Nov. 2016

[Non-Patent Literature 4] 3GPP R2-S 68686, Nokia, Alcatel-Lucent Shanghai Bell, "EPC—NR PDCP interaction for tight interworking: User Plane aspects", 3GPP TSG-RAN WG2 Meeting #96, Reno, USA, 14-18 Nov. 2016

[Non-Patent Literature 5] 3GPP TR 38.804 V0.4.0 (2016-11) "3rd Generation Partnership Project; Technical Specification Group Radio Access Network; Study on New Radio Access Technology; Radio Interface Protocol Aspects (Release 14)", November 2016

[Non-Patent Literature 6] 3GPP R2-164788, Nokia, Alcatel-Lucent Shanghai Bell, "Carrier Aggregation between carriers of different air interface numerologies", 3GPP TSG-RAN WG2 Meeting #95. Gothenburg, Sweden, 22-26 Aug. 2016

[Non-Patent Literature 7] 3GPP R2-165328, "Aggregation of carriers in NR", 3GPP TSG-RAN WG2 Meeting #95, Gothenburg, Sweden, 22-26 Aug. 2016

SUMMARY OF INVENTION

Technical Problem

The present inventors have studied interworking between E-UTRA and NR and found several problems. For example, the Secondary gNB (SgNB) serving as the secondary node supports multiple numerologies in DC architecture in which E-UTRA and NR are connected to the EPC (i.e., architecture options 3 and 3A). The 5G UE is also able to use multiple numerologies in one cell or between multiple cells simultaneously (that is, in one RRC connection). However, it is not clear how to perform a radio resource configuration regarding numerology of the SCG cell (or SCG carrier) on the UE when the SgNB supports multiple numerologies and the UE uses them.

The above problem regarding Numerology may occur also in other E-UTRA-NR DC architecture options (e.g., architecture options 7 and 7A). The architecture options 7 and 7A are Dual connectivity (DC) deployments including E-UTRA serving as the anchor RAT (or the primary RAT or the master RAT) and NR serving as the secondary RAT. In the options 7 and 7A, E-UTRA (LTE eNB) and NR (gNB) are connected to the 5G-CN. The NR user plane connection to the 5G-CN goes through the LTE eNB in the option 7, whereas in the option 7A, it directly passes through the user plane interface between the gNB and the 5G-CN. In the options 7 and 7A as well, it is also not clear how to perform a radio resource configuration regarding numerology of the SCG cell tor SCG carrier) on the UE when the SgNB supports multiple numerologies and the UE uses them.

A similar problem regarding Numerology may occur also in an Inter-RAT handover from E-UTRA to NR. That is, it is not clear how to perform a radio resource configuration regarding numerology of the target NR cell on the UE when the UE is handed over from the source LTE eNB to the target gNB that supports multiple numerologies.

Accordingly, one of the objects to be attained by embodiments disclosed herein is to provide an apparatus, a method, and a program that allow a UE to be configured with a numerology of a cell served by a secondary gNB or a target gNB in Inter-RAT Dual Connectivity between E-UTRA and NR and in an Inter-RAT handover from E-UTRA to NR. It should be noted that this object is merely one of the objects to be attained by the embodiments disclosed herein. Other objects or problems and novel features will be made apparent from the following description and the accompanying drawings.

Solution to Problem

In a first aspect, a second radio access network (RAN) node is used in a radio communication system. The radio communication system supports a first RAT and a second RAT. The second RAN node includes a memory and at least one processor coupled to the memory. The at least one processor is configured to send a radio resource configuration of the second RAT to a radio terminal via a first RAN node associated with the first RAT. The radio resource configuration explicitly or implicitly indicates at least one numerology that is included in multiple numerologies supported by the second RAT and is different from a reference numerology.

In a second aspect, a first radio access network (RAN) node is used in a radio communication system. The radio communication system supports a first RAT and a second RAT. The first RAN node includes a memory and at least one processor coupled to the memory. The at least one processor is configured to receive a radio resource configuration of the second RAT from a second RAN node associated with the second RAT and send the radio resource configuration to a radio terminal. The radio resource configuration explicitly or implicitly indicates at least one numerology that is included in multiple numerologies supported by the second RAT and is different from a reference numerology.

In a third aspect, a radio terminal is used in a radio communication system. The radio communication system supports a first RAT and a second RAT. The radio terminal includes at least one wireless transceiver and at least one processor. The at least one wireless transceiver is configured to communicate with a first radio access network (RAN) node associated with the first RAT and communicate with a second RAN node associated with the second RAT. The at least one processor is configured to receive a radio resource configuration of the second RAT from the second RAN node via the first RAN node. The radio resource configuration explicitly or implicitly indicates at least one numerology that is included in multiple numerologies supported by the second RAT and is different from a reference numerology.

In a fourth aspect, a method for a second radio access network (RAN) node includes sending a radio resource configuration of the second RAT to a radio terminal via a first RAN node associated with the first RAT. The radio resource configuration explicitly or implicitly indicates at least one numerology that is included in multiple numerologies supported by the second RAT and is different from a reference numerology.

In a fifth aspect, a method for a first radio access network (RAN) node includes receiving a radio resource configuration of the second RAT from a second RAN node associated with the second RAT, and sending the radio resource configuration to a radio terminal. The radio resource configuration explicitly or implicitly indicates at least one numerology that is included in multiple numerologies supported by the second RAT and is different from a reference numerology.

In a sixth aspect, a method for a radio terminal includes receiving a radio resource configuration of the second RAT from a second radio access network (RAN) node associated with the second RAT via a first RAN node associated with the first RAT. The radio resource configuration explicitly or implicitly indicates at least one numerology that is included in multiple numerologies supported by the second RAT and is different from a reference numerology.

In a seventh aspect, a program includes instructions (software codes) that, when loaded into a computer, cause the computer to perform the method according to the above-described fourth, fifth, or sixth aspect.

Advantageous Effects of Invention

According to the above-deceived aspects, it is possible to provide an apparatus, a method, and a program that allow a UE to be configured with a numerology of a cell served by a secondary gNB or a target gNB in Inter-RAT Dual Connectivity between E-UTRA and NR and in an Inter-RAT handover from E-UTRA to NR.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on DC architecture where E-UTRA and NR are connected to EPC. However, these embodiments may be applied to other radio communication systems supporting DC architecture where different RATs using different QoS frameworks are connected to a common core network.

First Embodiment

Figure 1:
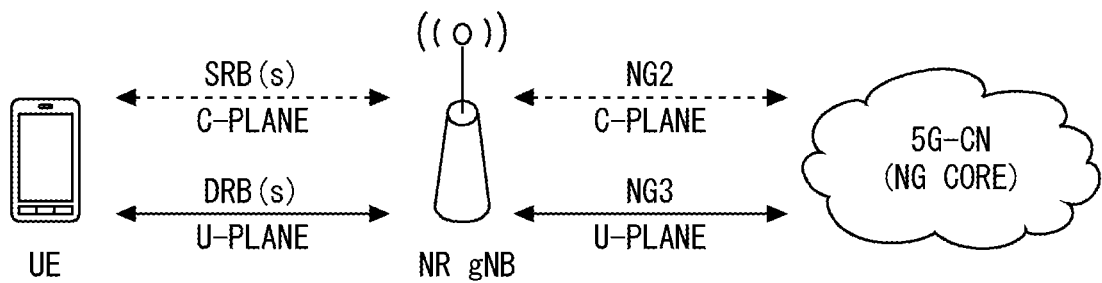
FIG. 1 is a diagram showing basic architecture of the 5G System according to the Background Art.
Figure 2:
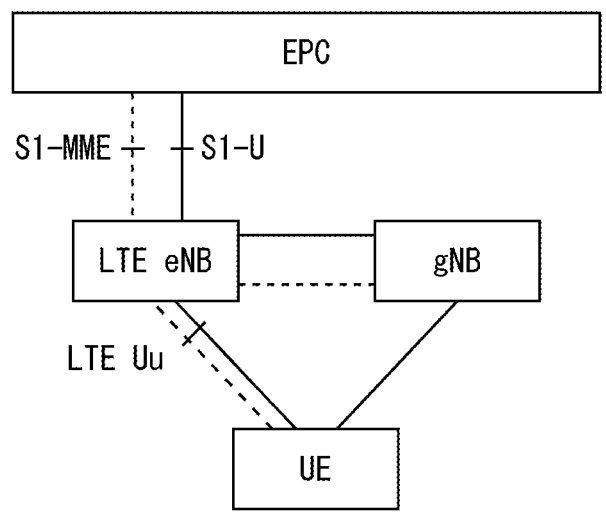
FIG. 2 is a diagram showing Architecture Option 3 for Dual Connectivity where E-UTRA (LTE eNB) and NR (gNB) are connected to EPC, according to the Background Art.
Figure 3:
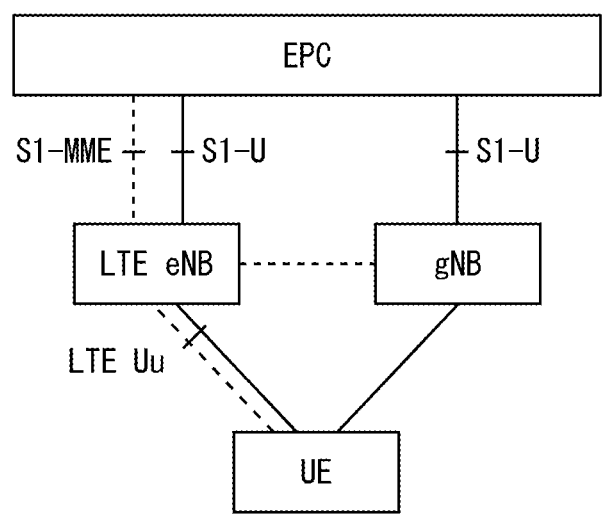
FIG. 3 is a diagram showing Architecture Option 3A for Dual Connectivity where E-UTRA (LTE eNB) and NR (gNB) are connected to EPC, according to the Background Art.
Figure 4:
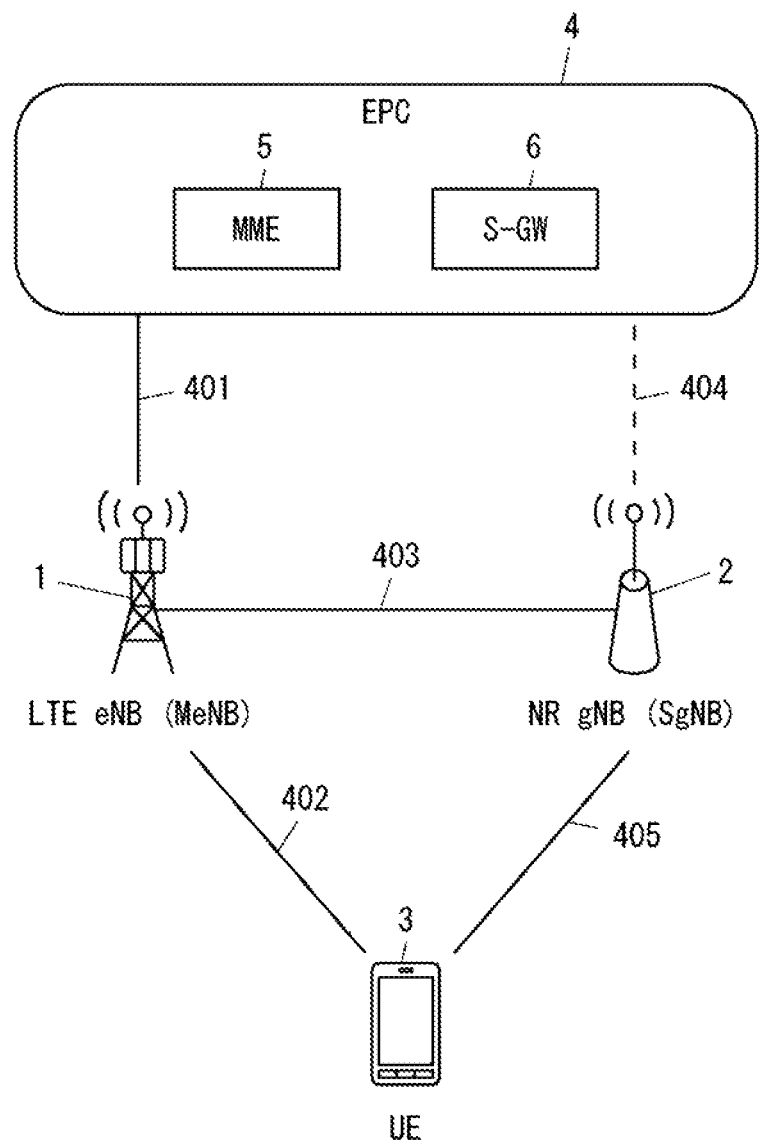
FIG. 4 is a diagram showing a configuration example of a radio communication network according to a plurality of embodiments.

FIG. 4 shows a configuration example of a radio communication network according to a plurality of embodiments including this embodiment. In the example shown in FIG. 4, the radio communication network includes an LTE eNB 1, an NR gNB 2, a UE 3, and an EPC 4. The radio communication network shown in FIG. 4 supports dual connectivity (DC) and also supports one or both of the above-described option 3 and option 3A. The options 3 and 3A support dual connectivity involving E-UTRA and NR, which are an anchor RAT (or a primary RAT) and a secondary RAT, respectively. In the options 3 and 3A, both E-UTRA (i.e., the LTE eNB 1) and NR (i.e., the gNB 2) are connected to the EPC 4. In the option 3, the NR user plane connection to the EPC 4 goes through the LTE eNB 1, and accordingly user packets of the UE 3 are transferred via an inter-base station interface 403 and via an interface 401 between the eNB 1 and the EPC. In contrast, in the option 3A, the NR user plane connection to the EPC 4 directly passes through a user plane interface 404 between the gNB 2 and the EPC 4.

The UE 3 has a capability to simultaneously communicate with the eNB 1 associated with the primary RAT (E-UTRA) and the gNB 2 associated with the secondary RAT (NR). In other words, the UE 3 has a capability to aggregate a cell of the eNB 1 associated with the primary RAT (E-UTRA) with a cell of the gNB 2 associated with the secondary RAT (NR). Further, in other words, the UE 3 has a capability to be configured with both a cell of the eNB 1 associated with the primary RAT (E-UTRA) and a cell of the gNB 2 associated with the secondary RAT (NR). In the architecture options 3 and 3A, an air interface 402 between the eNB 1 and the UE 3 provides a control plane connection and a user plane connection. Meanwhile, an air interface 405 between the gNB 2 and the UE 3 includes at least a user plane connection, but it does not need to include a control plane connection. In the DC architecture in which E-UTRA and NR are connected to the EPC 4, the master eNB (MeNB) 1 provides one or more E-UTRA MCG cells for the UE 3, while the secondary gNB (SgNB) 2 provides one or more NR SCG cells for the UE 3.

The EPC 4 includes multiple core network nodes including an MME 5 and an S-GW 6. The MME 5 is a control plane node while the S-GW 6 is a user plane node. The MME 5 performs mobility management and bearer management of UEs that have already attached to the core network (i.e., UEs in EMM-REGISTERED state). The mobility management is used to keep track of the current position of each UE and includes maintaining a mobility management context (MM context) regarding each UE. The bearer management includes controlling establishment of an EPS bearer for enabling each UE to communicate with an external network (Packet Data Network (PDN)) through E-UTRAN including the eNB 1 and through the EPC 4, and maintaining an EPS bearer context regarding each UE. The S-GW 6 is a gateway with E-UTRAN and is connected via an S1-U interface to one or both of the eNB 1 and the gNB 2.

The gNB 2 supports multiple numerologies in one or more NR carriers (or cells). That is, one or more numerologies are associated with one NR cell. Numerology includes at least one of subcarrier spacing, system bandwidth, a Transmission Time Interval (TTI) length, subframe duration, slot duration, the number of slots per subframe, a Cyclic prefix length, symbol duration, and the number of symbols per subframe. When the system bandwidth corresponds to the bandwidth supported by aggregation of multiple carriers (i.e. Carrier Aggregation (CA)) in UE viewpoints, the numerology may further include information regarding the correspondence between the bandwidth of the multiple aggregated carriers and the system bandwidth. The multiple numerologies include at least one reference numerology and at least one dedicated or additional numerology that is different from the reference numerology. The reference numerology defines a reference subframe configuration for the NR carrier(s) that the gNB 2 supports (e.g., reference subframe duration, the reference number of OFDM symbols per subframe, or a reference TTI length). The information regarding the reference numerology may be transmitted in system information (e.g., Master Information Block), or may be defined in the standard specification so that it is uniquely determined with respect to a carrier frequency, or may be detected by the UE 3 by receiving a synchronisation signal (e.g., a Primary Synchronisation Signal (PSS) or a Secondary Synchronisation Signal (SSS)).

The following describes a procedure for configuring the UE 3 with a numerology(ies) of an SCG cell(s) served by the secondary gNB (SgNB) 2 in DC architecture in which E-UTRA and NR are connected to the EPC 4. The gNB 2 according to this embodiment is configured to send an NR radio resource configuration for E-UTRANR Dual Connectivity (DC) to the UE 3 via the master eNB (MeNB) 1. The NR radio resource configuration explicitly or implicitly indicates at least one dedicated numerology that is included in multiple numerologies supported by one or more NR cells within the SCG of the SgNB 2 and is different from the reference numerology. That is, the NR radio resource configuration includes at least information regarding the dedicated numerology. The information regarding the dedicated numerology may include an information element explicitly indicating the dedicated numerology, or may include an information element indicating a radio parameter(s) that is necessary to derive the dedicated numerology. The dedicated numerology may be, for example, subcarrier spacing, system bandwidth, a TTI length, subframe duration, slot duration, the number of slots per subframe, a Cyclic prefix length, symbol duration, or the number of symbols per subframe, or any combination thereof. The NR radio resource configuration may be referred to as an SCG radio configuration or an SCG-Config. The MeNB 1 is configured to receive the NR radio resource configuration from the SgNB 2 and send it to the UR 3. The UR 3 is configured to receive the NR radio resource configuration for E-UTRA-NR DC from the SgNB 2 via the MeNB 1.

In some implementations, the SgNB 2 may receive a radio bearer setup request from the MeNB 1, and select at least one dedicated numerology according to requirements for an NR Data Radio Bearer (DRB) for the UE 3 indicated by the radio bearer setup request. The radio bearer setup request is a message for causing the gNB 2 to configure an NR DRB for E-UTRA-NR DC. This radio bearer setup request may be referred to as an SgNB Addition Request. The requirements for an NR DRB may include one or both of QoS requirements and a service type. The QoS requirements include at least one of: a priority required for an NR DRB, or for a network bearer or a flow associated with the NR DRB; a Maximum Bit Rate (MBR); and an Allocation and Retention Priority (ARP). The service type indicates, for example, one of enhanced Mobile Broad Band (eMBB), Ultra Reliable and Low Latency Communication (URLLC), and massive Machine Type Communication (mMTC).

The SgNB 2 may include in the NR radio resource configuration an information element indicating the selected at least one dedicated numerology. In this case, the SgNB 2 may send the NR radio resource configuration, which explicitly or implicitly indicates the selected at least one numerology, to the MeNB 1 using a response message (e.g., an SgNB Addition Request Acknowledge message) in response to the radio bearer setup request. The MeNB 1 may transmit the NR radio resource configuration received from the SgNB 2 to the UE 3 using an RRC Connection Reconfiguration message.

Figure 5:
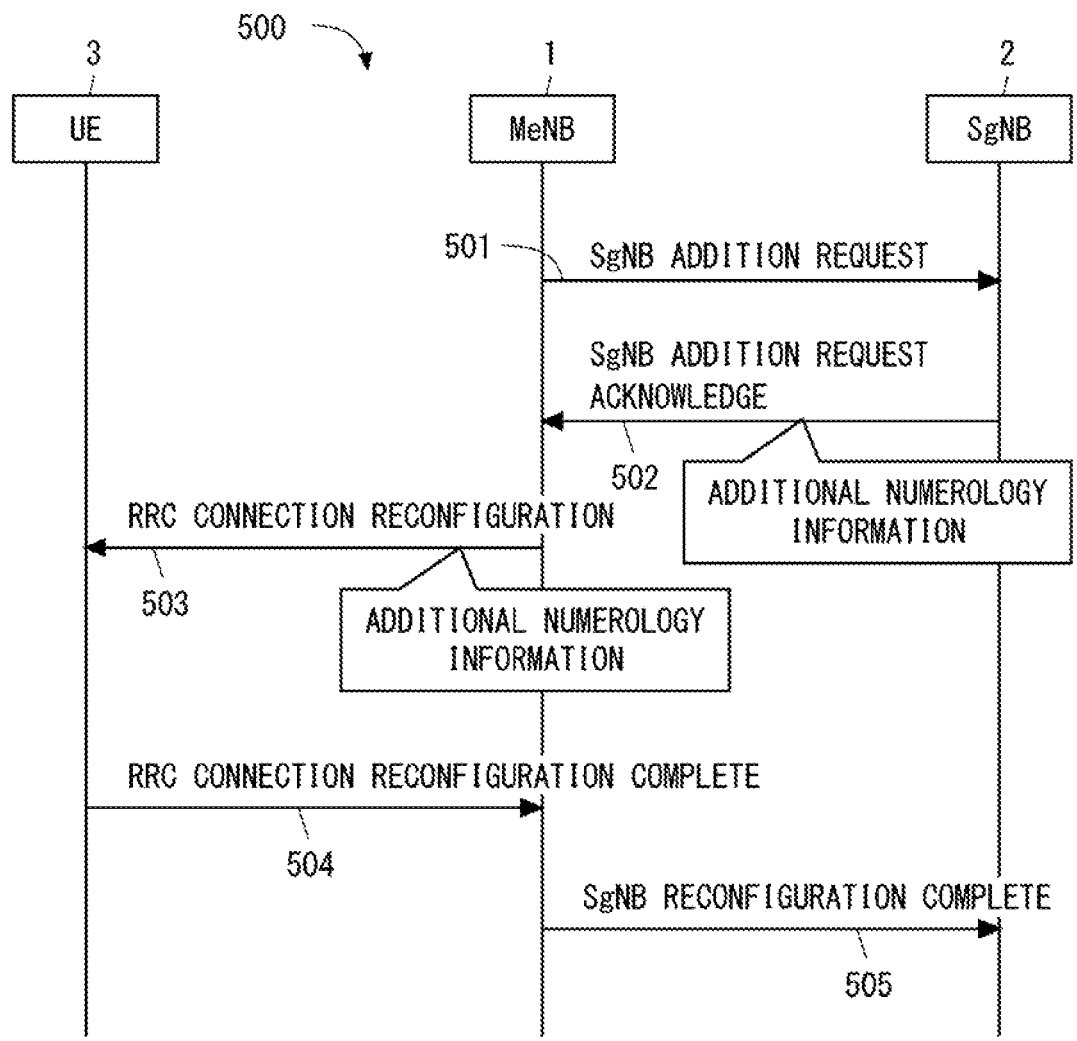
FIG. 5 is a sequence diagram showing an example of an SCG establishment procedure according to a first embodiment.

FIG. 5 is a sequence diagram showing a process 500 that is one example of an SCG establishment procedure according to this embodiment. The procedure shown in FIG. 5 basically follows the SeNB Addition procedure in LTE DC. In Step 501, the MeNB 1 sends an SgNB Addition Request message to the SgNB 2. The SgNB Addition Request message requests the SgNB 2 to configure a radio bearer (i.e., SCG DRB) for DC that uses E-UTRA and NR as respectively the primary RAT and the secondary RAT.

The SgNB Addition Request message corresponds to the above-described "radio bearer setup request". Specifically, the SgNB Addition Request message includes an "SgNB Security Key (for SCG bearer)" information element (IE), an "E-RAB To Be Added List" IE, and an "MeNB to SgNB Container" IE. The "E-RAB To Be Added List" IE includes an E-RAB ID and E-RAB Level QoS Parameters of each E-RAB required by the MeNB 1 to be established. The "MeNB to SgNB Container" IE includes an RRC: SCG-ConfigInfo message. The RRC: SCG-ConfigInfo message is used by the MeNB in order to request the SgNB to establish, modify, or release an SCG. The SCG-ConfigInfo message includes, for example, an EPS bearer Identity, a DRB Identity, and a DRB type. The security policy (e.g., security algorithm) used in a cell (e.g., radio link, AS layer) of the secondary RAT (NR) may be different from that used in a cell (e.g., radio link. Access Stratum (AS) layer) of the primary RAT (E-UTRA). In this case, the SgNB Security Key IE may include information regarding the security policy used in a cell of the secondary RAT (NR). Further, the SgNB 2 may include this security policy-related information into an RRC: SCG-Config message to be transmitted to the UE 3.

In Step 502, the SgNB 2 sends an SgNB Addition Request Acknowledge message to the MeNB 1. The SgNB Addition Request Acknowledge message is a response message to the SgNB Addition Request message. The SgNB Addition Request Acknowledge message includes a radio resource configuration for an SCG DRB generated by the SgNB 2. This SCG DRB radio resource configuration is sent to the UE 3 via the MeNB 1. The SCG DRB radio resource configuration indicates at least one dedicated numerology selected by the SgNB 2.

Specifically, the SgNB Addition Request Acknowledge message includes an "E-RAB Admitted To Be Added List" IE and an "SgNB to MeNB Container" IE. The "SgNB to MeNB Container" IE includes an RRC: SCG-Config message. The RRC: SCG-Config message is used to transfer a radio resource configuration generated by the SgNB 2. The RRC: SCG-Config message indicates at least one dedicated numerology selected by the SgNB 2.

In Step 503, the MeNB 1 sends an RRC Connection Reconfiguration message to the UE 3 in response to receiving the SgNB Addition Request Acknowledge message from the SgNB 2. This RRC Connection Reconfiguration message includes the RRC: SCG-Config message, which has been sent from the SgNB 2 to the MeNB 1 via the SgNB Addition Request Acknowledge message. The AS layer of the primary RAT (i.e., E-UTRA (LTE)) in the UE 3 receives this RRC Connection Reconfiguration message in an E-UTRA cell of the MeNB 1 (i.e., the Primary Cell (PCell)). The AS layer of the secondary RAT (i.e., NR) in the UE 3 configures, in accordance with the RRC: SCG-Config message, an SCG DRB according to the at least one dedicated numerology selected by the SgNB 2.

In Step 504, the UE 3 (i.e., the E-UTRA AS layer) sends an RRC Connection Reconfiguration Complete message to the MeNB 1 in the E-UTRA cell of the MeNB 1 (i.e., PCell). Meanwhile, the UE 3 (i.e., the NR AS layer) starts a procedure for synchronizing with the SgNB 2 (e.g., Random Access Procedure).

In Step 505, the MeNB 1 sends an SgNB Reconfiguration Complete message to the SgNB 2 in response to receiving the RRC Connection Reconfiguration Complete message from the UE 3.

As can be understood from the above description, the SgNB 2 according to this embodiment is configured to send the NR radio resource configuration for E-UTRA-NR DC to the UE 3 via the master eNB (MeNB) 1, and the NR radio resource configuration indicates at least one dedicated numerology that is included in the multiple numerologies supported by one or more NR cells of the SgNB 2 and is different from the reference numerology. This allows the SgNB 2 to configure the UE 3 with the numerology(ies) of the SCG cell(s) served by the SgNB 2 in E-UTRA-NR DC.

The UE 3 thus can know the numerology(ies) that should be used in the SCG cell(s) served by the SgNB 2.

Second Embodiment

A configuration example of a radio communication network according to this embodiment is similar to that shown in FIG. 4. This embodiment provides an improvement that enables the MeNB 1 to use a UE measurement report indicating a measurement result of an NR cell(s) of the SgNB 2 based on a reference numerology(ies) in E-UTRA-NR DC.

The SgNB 2 according to this embodiment is configured to notify the MeNB 1 of at least one reference numerology in a setup procedure of an inter-base station interface between the SgNB 2 and the MeNB 1 (e.g., an Xn interface or an X3 interface). As already described above, the reference numerology defines the reference subframe duration for the NR carrier supported by the gNB 2.

Figure 6:
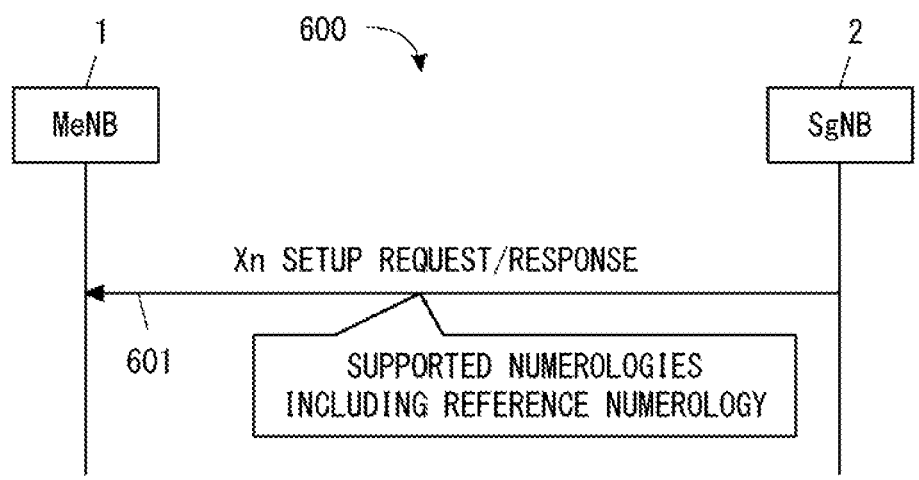
FIG. 6 is a sequence diagram showing an example of signaling between an MeNB and an SgNB according to a second embodiment.

FIG. 6 is a sequence diagram showing a process 600 that is one example of signaling between the MeNB 1 and the SgNB 2. In Step 601, the SgNB 2 notifies the MeNB 1 of multiple numerologies supported in one or more NR carriers used by the SgNB 2 via an Xn Setup Request message or an Xn Setup Response message. The numerologies supported by the SgNB 2 include at least one reference numerology.

Figure 7:
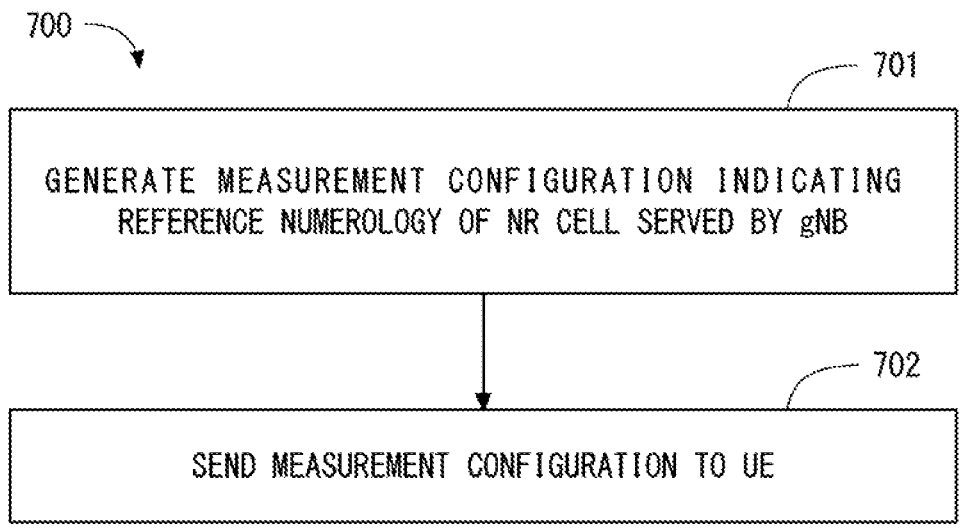
FIG. 7 is a flowchart showing an example of an operation of an LTE eNB (MeNB) according to the second embodiment.

In some implementations, the MeNB 1 may use the reference numerology(ies) of the SgNB 2 for UE measurement. FIG. 7 is a flowchart showing a process 700 that is one example of the operation of the MeNB 1. In Step 701, the MeNB 1 generates a measurement configuration indicating the reference numerology(ies) of the NR cell(s) served by the SgNB 2. In Step 702, the MeNB 1 sends the generated measurement configuration to the UE 3. The measurement configuration causes the UE 3 to measure the NR cell(s) of the SgNB 2 based on the reference numerology(ies) specified in the measurement configuration. Accordingly, the MeNB 1 is able to use a UE measurement report indicating a measurement result of the NR cell(s) of the SgNB 2 based on the reference numerology(ies). The MeNB 1 may use the measurement result of the NR cell(s) of the SgNB 2 based on the reference numerology(ies) in order to determine start, stop, or modification of E-UTRA-NR DC.

Third Embodiment

A configuration example of a radio communication network according to this embodiment is similar to that shown in FIG. 4. This embodiment provides an improvement that enables the SgNB 2 to instruct the UE 3 to perform measurement of an NR cell(s) of the SgNB 2 based on a reference numerology(ies) in E-UTRA-NR DC.

Figure 8:
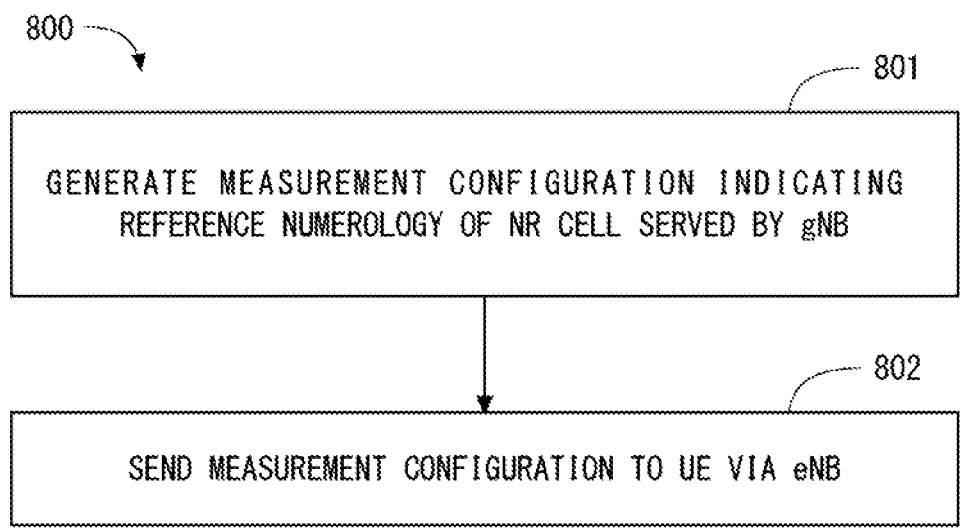
FIG. 8 is a flowchart showing an example of an operation of a NR gNB (SgNB) according to a third embodiment.

The SgNB 2 according to this embodiment is configured to send to the UE 3, via the MeNB 1, a configuration for measurement on the carrier of the SgNB 2 according to the reference numerology. FIG. 8 is a flowchart showing a process 800 that is one example of the operation of the SgNB 2. In Step 801, the SgNB 2 generates a measurement configuration indicating the reference numerology(ies) of the NR cell(s) served by the SgNB 2. In Step 802, the SgNB 2 sends the generated measurement configuration to the UE 3 via the MeNB 1. To be more specific, the MeNB 1 may receive the measurement configuration from the SgNB 2 and transmit it to the UE 3. The measurement configuration causes the UE 3 to measure the NR cell(s) of the SgNB 2 based on the reference numerology(ies) specified in the measurement configuration. Accordingly, the MeNB 1 is able to use a UK measurement report indicating a measurement result of the NR cell(s) of the SgNB 2 based on the reference numerology(ies). The MeNB 1 may use the measurement result of the NR cell(s) of the SgNB 2 based on the reference numerology(ies) in order to determine start, stop, or modification of E-UTRA-NR DC.

Fourth Embodiment

This embodiment provides an improvement that allows a UE to be configured with a numerology(ies) of a cell(s) served by a secondary gNB or a target gNB in other E-UTRA-NR DC architectures (e.g., the architecture options 7 and 7A) and an Inter-RAT handover from E-UTRA to NR.

Figure 9:
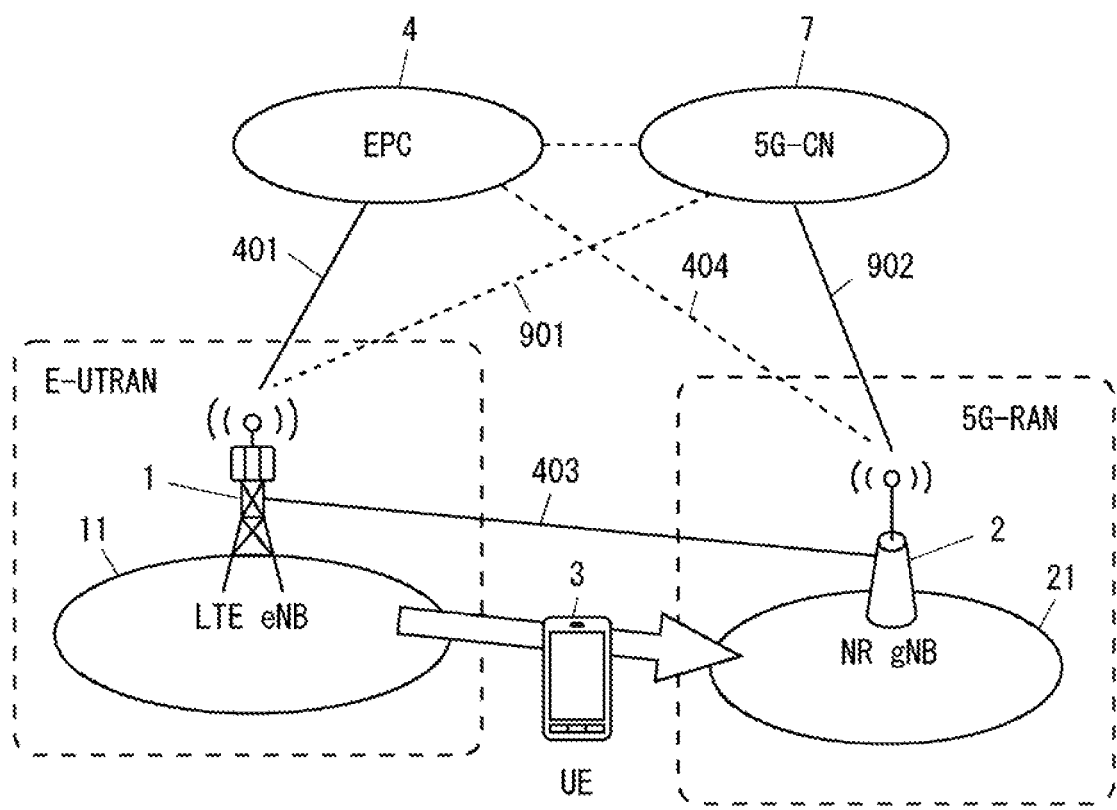
FIG. 9 is a diagram showing a configuration example of a radio communication network according to a fourth embodiment.

FIG. 9 shows a configuration example of a radio communication network according to this embodiment. In one example, the radio communication network according to this embodiment may provide B-UTRA-NR DC architecture option 7 or 7A. In the options 7 and 7A, E-UTRA (i.e., the LTE eNB 1) and NR (i.e., the gNB 2) are connected to a 5G-CN 7. In the option 7, the NR user plane connection to the 5G-CN 7 goes through the LTE eNB 1, and thus user packets of the UE 3 passes through the inter-base station interface 403 and through the interface 901 between the eNB 1 and the 5G-CN 7. In contrast, in the option 7A, the NR user plane connection to the 5G-CN 7 directly passes through the user plane interface 902 between the gNB 2 and the 5G-CN 7.

The following describes a procedure for configuring the UE 3 with a numerology(ies) of an SCG cell(s) served by the secondary gNB (SgNB) 2 in DC architecture in which E-UTRA and NR are connected to the 5G-CN 7. The gNB 2 according to this embodiment may operate in a way similar to that in the gNB 2 according to the first embodiment. Specifically, in this embodiment, the gNB 2 is configured to send an NR radio resource configuration for E-UTRA-NR Dual Connectivity (DC) to the UE 3 via the master eNB (MeNB) 1. The NR radio resource configuration indicates at least one dedicated numerology that is included in multiple numerologies supported by one or more NR cells within the SCG of the SgNB 2 and is different from the reference numerology.

The operations of the MeNB 1, the SgNB 2, and the UE 3 may be similar to those in the SCG establishment procedure (Process 500) described with reference to FIG. 5. Specifically, the SgNB 2 may send an SgNB Addition Request Acknowledge message containing an RRC: SCG-Config message that indicates at least one dedicated numerology selected by the SgNB 2 (Step 502). The MeNB 1 may send to the UE 3 an RRC Connection Reconfiguration message containing the RRC: SCG-Config message indicating the at least one dedicated numerology selected by the SgNB 2 (Step 503). The AS layer of the secondary RAT (i.e., NR) in the UE 3 may configure, in accordance with the RRC: SCG-Config message, an SCG DRB according to the at least one dedicated numerology selected by the SgNB 2 (Step 504).

Further or alternatively, the radio communication network according to this embodiment may support an Inter-RAT handover from an E-UTRA cell 11 of the LTE eNB 1 to an NR cell 21 of the NR gNB 2. The following describes a procedure for configuring the UE 3 with a numerology(ies) of the cell 21 served by the target NR gNB 2 when the UE 3 is handed over from the source E-UTRA cell 11 to the target NR cell 21.

Figure 10:
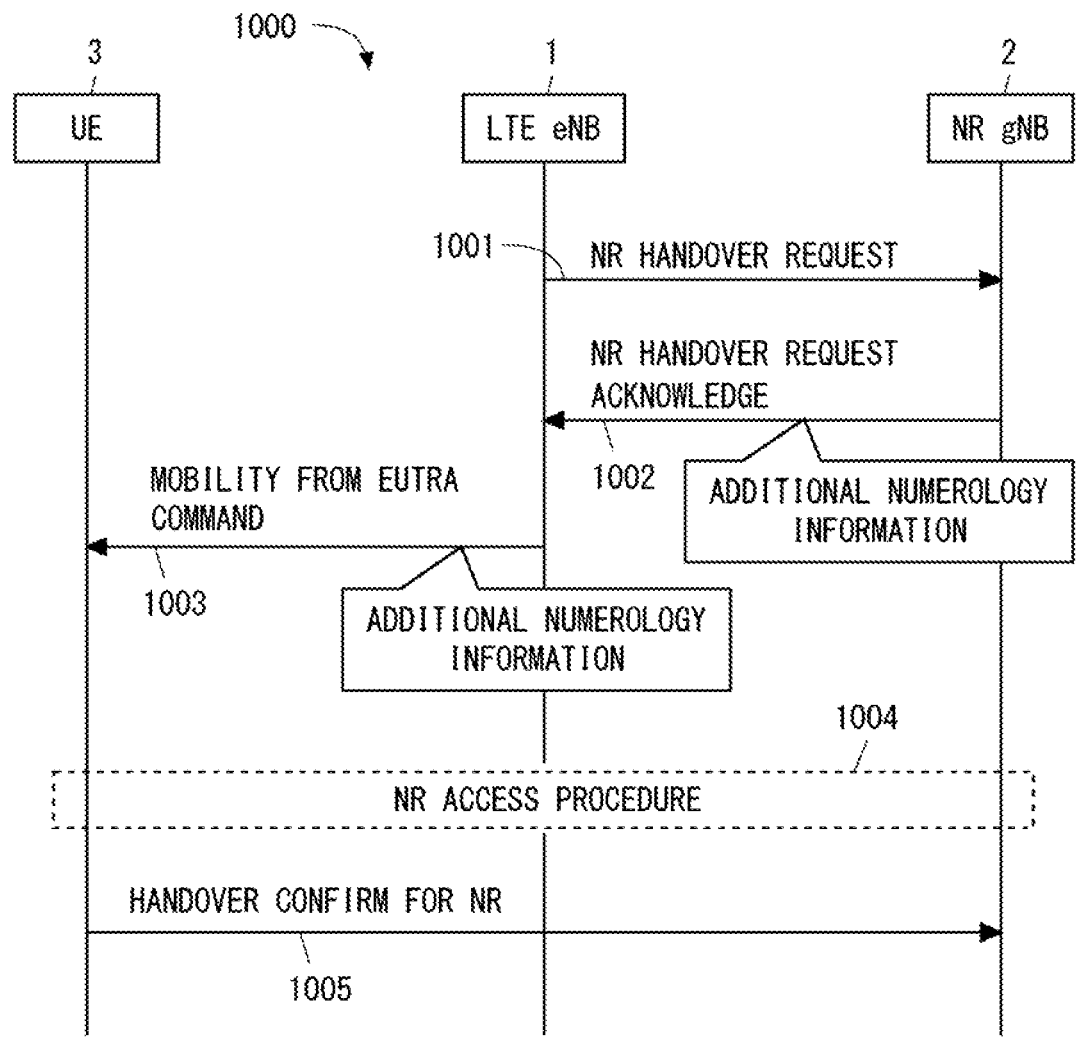
FIG. 10 is a sequence diagram showing an example a procedure of an Inter-RAT handover according to the fourth embodiment.

FIG. 10 is a sequence diagram showing a process 1000 that is one example of an Inter-RAT handover procedure according to this embodiment. In Step 1001, the source LTE eNB 1 sends an NR Handover Request message to the target gNB 2 on the direct inter-base station interface 403 (e.g., an Xn interface or an X3 interface). The NR Handover Request message in Step 1001 may include a Handover Type Information Element (IE) indicating a handover from LTE to NR. For example, the Handover Type IE is set to "LTEtoNR".

In Step 1002, the target gNB 2 generates a UE context based on the NR Handover Request message and allocates resources. Then the target gNB 2 sends an NR Handover Request Acknowledge message to the source eNB 1. The NR Handover Request Acknowledge message is a response message to the NR Handover Request message. The NR Handover Request Acknowledge message includes a radio resource configuration of a DRB of the target NR cell 21 generated by the target gNB 2. The radio resource configuration is sent to the UE 3 via the source eNB 1. This radio resource configuration indicates at least one dedicated numerology selected by the target gNB 2.

To be more specific, the NR Handover Request Acknowledge message contains a "Target to Source Transparent Container" IE. The "Target to Source Transparent Container" IE includes radio resource configuration information set up by the target gNB 2. This radio resource configuration information indicates at least one dedicated numerology provided in the target NR cell 21.

In Step 1003, the source eNB 1 sends to the UE 3 an RRC message that contains a Handover Command message including the radio resource configuration information generated by the target gNB 2. This RRC message may be, for example, a Mobility from EUTRA command message or may be an RRC Connection Reconfiguration message. The source eNB 1 may include the radio resource configuration information generated by the target gNB 2 into the "MobilityControlInfoNR" IE within the RRC Connection Reconfiguration message.

In Step 1004, the UE 3 moves to a cell of the target RAN (i.e., NR) in response to receiving the RRC message that contains the Handover Command message and executes a handover in accordance with the radio resource configuration information provided by the Handover Command message. The UE 3 thus establishes a radio connection with the target gNB 2 according to at least one dedicated numerology selected by the SgNB 2. The information regarding which numerology should be used to execute a handover (or which numerology should be assumed at the time of the execution of a handover) may be transmitted in the Handover Command message or the RRC message including this Handover Command message. The UE 3 executes a handover in accordance with this information (e.g., establishes the radio connection).

In Step 1005, the UE 3 sends the Handover Confirm for NR message to the target gNB 2 after it has successfully synchronized with the target NR cell 21. The message in Step 1005 may be an (NR) RRC Connection Reconfiguration Complete message.

As can be understood from the above description, in one example, the gNB 2 according to this embodiment is configured to send the NR radio resource configuration for E-UTRA-NR DC (i.e., option 7 or 7A) to the UE 3 via the MeNB 1, and the NR radio resource configuration indicates at least one dedicated numerology that is included in the multiple numerologies supported by one or more NR cells of the SgNB 2 and is different from the reference numerology. This allows the SgNB 2 to configure the UE 3 with numerology(ies) of the SCG cell(s) served by the SgNB 2 in E-UTRA-NR DC (i.e., option 7 or 7A). The UE 3 thus can know the numerology(ies) that should be used in the SCG cell(s) served by the SgNB 2.

In another example, the gNB 2 according to this embodiment is configured to send to the UE 3, via the source eNB 1, the NR radio resource configuration for an Inter-RAT handover from E-UTRA to NR, and the NR radio resource configuration indicates at least one dedicated numerology that is included in the multiple numerologies supported by one or more NR cells of the target gNB 2 and is different from the reference numerology. This allows the target gNB 2 to configure the UE 3 with the numerology(ies) of the target NR cell(s) in the Inter-RAT handover from E-UTRA to NR. The UE 3 can thus know the numerology(ies) that should be used in at least one NR cell 21 served by the target gNB 2.

Figure 11:
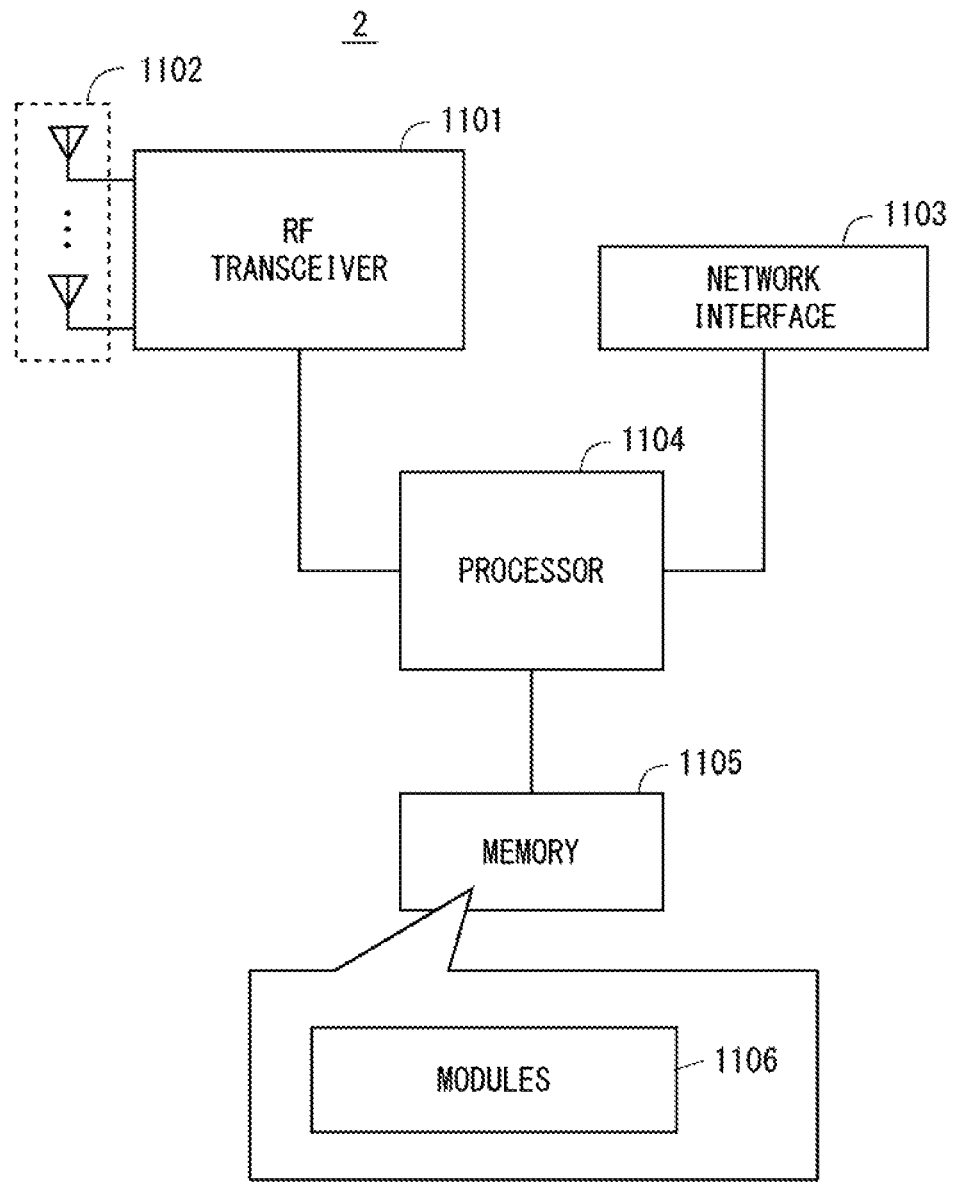
FIG. 11 is a block diagram showing a configuration example of a NR gNB according to a plurality of embodiments.

The following provides configuration examples of the LTE eNB 1, the NR gNB 2, and the UE 3 according to the above embodiments. FIG. 9 is a block diagram showing a configuration example of the NR gNB 2 according to the above embodiments. The configuration of the LTE eNB 1 may be similar to that shown in FIG. 11. Referring to FIG. 11, the NR gNB 2 includes a Radio Frequency transceiver 1101, a network interface 1103, a processor 1104, and a memory 1105. The RF transceiver 1101 performs analog RF signal processing to communicate with NG UEs including the UE 3. The RF transceiver 1101 may include multiple transceivers. The RF transceiver 1101 is coupled to an antenna array 1102 and the processor 1104. The RF transceiver 1101 receives modulated symbol data from the processor 1104, generates a transmission RF signal, and supplies the transmission RF signal to the antenna array 1102. Further, the RF transceiver 1101 generates a baseband reception signal based on a reception RF signal received by the antenna array 1102 and supplies the baseband reception signal to the processor 1104. The RF transceiver 1101 may include an analog beamformer circuit for beam forming. The analog beamformer circuit includes, for example, multiple phase shifters and multiple power amplifiers.

The network interface 1103 is used to communicate with network nodes (e.g., the LTE eNB 1, the MME 5, and the S-GW 6). The network interface 1103 may include, for example, a network interface card (NIC) conforming to the IEEE 802.3 series.

The processor 1104 performs digital baseband signal processing (i.e., data-plane processing) and control-plane processing for radio communication. The processor 1104 may include multiple processors. The processor 1104 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1104 may include a digital beamformer module for beam forming. The digital beamformer module may include a Multiple Input Multiple Output (MIMO) encoder and a pre-coder.

The memory 1105 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1105 may include a storage located apart from the processor 1104.

In this case, the processor 1104 may access the memory 1105 via the network interface 1103 or an I/O interface (not shown).

The memory 1105 may store one or more software modules (computer programs) 1106 including instructions and data to perform processing by the gNB 2 described in the above embodiments. In some implementations, the processor 1104 may be configured to load the software modules 1106 from the memory 1105 and execute the loaded software modules, thereby performing processing of the gNB 2 described in the above embodiments.

Figure 12:
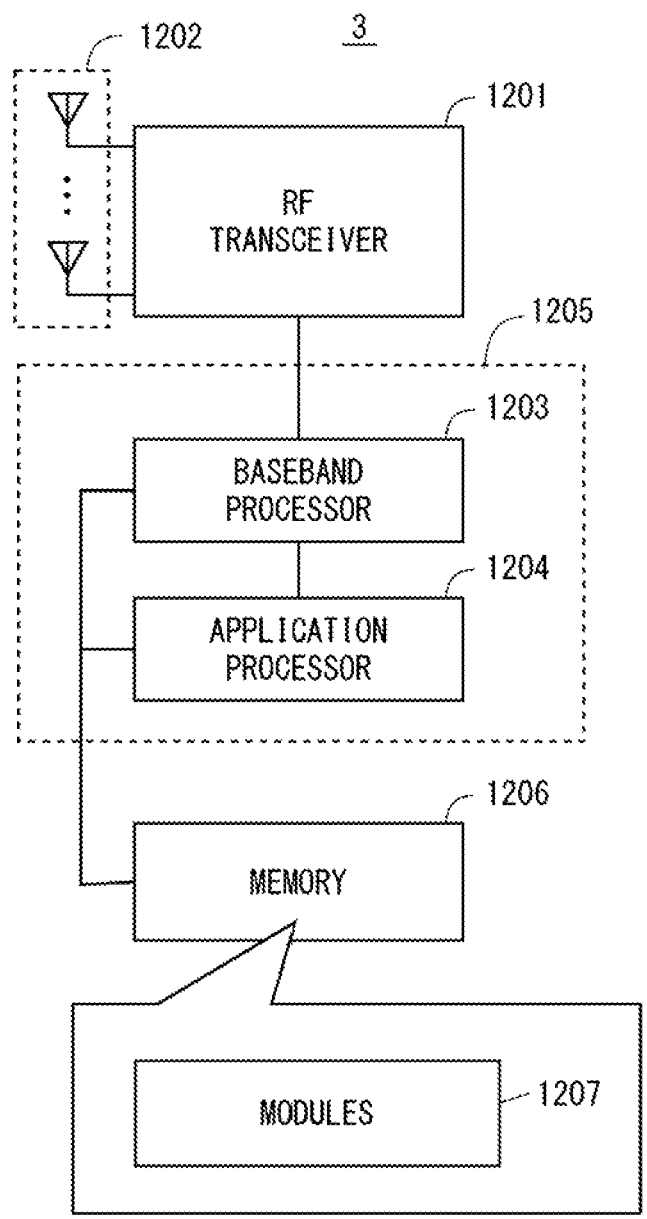
FIG. 12 is a block diagram showing a configuration example of a UE according to a plurality of embodiments.

FIG. 12 is a block diagram showing a configuration example of the UE 3. A Radio Frequency (RP) transceiver 1201 performs analog RF signal processing to communicate with the eNB 1 and the gNB 2. The RF transceiver 1201 may include multiple transceivers. The analog RF signal processing performed by the RF transceiver 1201 includes frequency up-conversion, frequency down-conversion, and amplification. The RF transceiver 1201 is coupled to an antenna array 1202 and a baseband processor 1203. The RF transceiver 1201 receives modulated symbol data (or OFDM symbol data) from the baseband processor 1203, generates a transmission RF signal, and supplies the transmission RF signal to the antenna array 1202. Further, the RF transceiver 1201 generates a baseband reception signal based on a reception RF signal received by the antenna array 1202 and supplies the baseband reception signal to the baseband processor 1203. The RF transceiver 1201 may include an analog beamformer circuit for beam forming. The analog beamformer circuit includes, for example, multiple phase shifters and multiple power amplifiers.

The baseband processor 1203 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation. and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1203 may include, for example, signal processing of a Packet Data Convergence Protocol (PDCP) layer, a Radio Link Control (RLC) layer, a MAC layer, and a PHY layer. Further, the control-plane processing performed by the baseband processor 1203 may include processing of a Non-Access Stratum (NAS) protocol, an RRC protocol, and MAC CEs.

The baseband processor 1203 may perform MIMO encoding and pre-coding for beam forming.

The baseband processor 1203 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1204 described in the following.

The application processor 1204 is also referred to as a CPU, an MPU, a microprocessor, or a processor core. The application processor 1204 may include multiple processors (processor cores). The application processor 1204 loads a system software program (Operating System (OS)) and various application programs (e.g., a call application, a WEB browser, a mailer, a camera operation application, and a music player application) from a memory 1206 or from another memory (not shown) and executes these programs, thereby providing various functions of the UE 3.

In some implementations, as represented by a dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. An SoC device may be referred to as a system Large Scale Integration (LSI) or a chipset.

The memory 1206 is a volatile memory, a non-volatile memory, or a combination thereof. The memory 1206 may include multiple memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1206 may include, for example, an external memory device that can be accessed from the baseband processor 1203, the application processor 1204, and the SoC 1205. The memory 1206 may include an internal memory device that is integrated in the baseband processor 1203, the application processor 1204, or the SoC 1205. Further, the memory 1206 may include a memory in a Universal Integrated Circuit Card (UICC).

The memory 1206 may store one or more software modules (computer programs) 1207 including instructions and data to perform the processing by the UE 3 described in the above embodiments. In some implementations, the baseband processor 1203 or the application processor 1204 may load these software modules 1207 from the memory 1206 and execute the loaded software modules, thereby performing the processing of the UE 3 described in the above embodiments with reference to the drawings.

As described above with reference to FIGS. 11 and 12, each of the processors included in the eNB 1, the gNB 2, and the UE 3 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM). Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The above-described embodiments describe examples in which the SgNB Addition procedure following the SeNB Addition procedure is used. In the above-described embodiments, an SgNB Modification procedure which follows the SeNB Modification procedure may instead be used in place of the SgNB Addition procedure. The MeNB 1 may send, for example, an SgNB Modification Request message to the SgNB 2 in place of the SgNB Addition Request message (e.g., Step 501 shown in FIG. 5).

The MeNB 1 may perform UE Capability Coordination between the MeNB 1 and the SgNB 2 before sending the radio bearer setup request (e.g., the SgNB Addition Request message or the SgNB Modification Request message) to the SgNB 2. The MeNB 1 may send, for example, a UE Capability Coordination Request message to the SgNB 2, and receive a UE Capability Coordination Response message from the SgNB 2. In this Coordination, the MeNB 1 and the SgNB 2 may share (or negotiate) only a fixed UE capabilities (e.g., capabilities that are not substantially changed while data is being transmitted or received in DC, or hard-split capabilities), such as RF capability (e.g., Band combination, measurement capability). The MeNB 1 and the SgNB 2 may also negotiate static UE capabilities (e.g., capabilities that are not dynamically changed during DC, or dynamically-shared capabilities), such as capabilities related to the UE category specification (e.g., soft buffer/soft channel bit). Alternatively, the MeNB) 1 and the SgNB 2 may share static UE capabilities in the step of exchanging SeNB Addition Request/Acknowledge messages (or SeNB Modification Request/Acknowledge messages).

The Information Elements included in the messages described in the above-described embodiments (e.g., the SgNB Addition Request message, the SgNB Addition Request Acknowledge message, the RRC Connection Reconfiguration message, the RRC Connection Reconfiguration Complete message, the SgNB Reconfiguration Complete message, the Xn Setup Request message, the Xn Setup Response message, the NR Handover Request message, the NR Handover Request Acknowledge message) are not limited to the above-described ones. The Information Elements contained in the above-described messages may be, for example, communicated and negotiated in directions or between nodes different from those described in the above embodiments for the purpose of performing DC between the LTE eNB 1 and the NR gNB 2, or performing a handover from E-UTRA to NR. As a more specific example, at least some of the information elements included in the SgNB Addition Request message may be included in the SgNB Addition Request Acknowledge message. In addition or alternatively, at least a part of the information elements included in the SgNB Addition Request message may be included in an S1AP message sent from the EPC 4 (the MME 5) to the LTE eNB 1 (e.g., an S1AP: E-RAB Setup Request message). It is possible to allow nodes related to DC performed between the LTE eNB 1 and the NR gNB 2 to share information needed for the DC.

The operations and processes of the UE 2, the base stations (the LTE eNB 1 and the NR gNB 2), and the core networks (the EPC 4 and the 5G-CN 7) described in the above embodiments may also be applied to Intra-NR Dual Connectivity and an Inter-gNB Handover. It is possible, for example, that a configuration of the numerology may be different even between neighbour cells within a single NR system. Accordingly, when Dual Connectivity or handover is executed, the numerology that should be used in the secondary cell or the target cell may be configured per UE. To be more specific, the secondary (or target) gNB may send to the UE 3, via the primary (or source) gNB, an NR radio resource configuration explicitly or implicitly indicating at least one dedicated numerology that is included in multiple numerologies supported by one or more NR cells of the secondary (or target) gNB and is different from the reference numerology.

In the above embodiments, each numerology may be associated with one or more network slices or network slice instances. The information indicating the dedicated numerology(ies) described in the above embodiments may be, for example, information indicating a predetermined network slice or network slice instance (e.g., network slice identity, network slice instance identity). Upon receiving the information indicating the predetermined network slice or network slice instance, the UE 2 may detect the dedicated numerology that is associated with this predetermined network slice or network slice instance. Further, the reference numerology may also be associated with a network slice or network slice instance. In this case, the network slice or the network slice instance associated with the reference numerology may be commonly configured (or available) for UEs in a cell. In the case of E-UTRA-NR Dual Connectivity in which E-UTRA and NR are connected to EPC, the network slice may be a Dedicated Core network Node (DCN). In this case, a DCN identifier (e.g., DCN ID) may be associated with the dedicated numerology.

The LTE eNB 1 and the NR gNB 2 described in the above embodiments may be implemented based on a Cloud Radio Access Network (C-RAN) concept. The C-RAN is also referred to as a Centralized RAN. In this case, processes and operations performed by each of the LTE eNB 1 and the gNB 2 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP). That is, processes and operations performed by each of the LTE eNB 1 and the gNB 2 described in the above embodiments may be provided by one or more radio stations (or RAN nodes).

Further, the above-described embodiments are merely examples of applications of the technical ideas obtained by the inventors. These technical ideas are not limited to the above-described embodiments and various modifications may be made thereto.

For example, the whole or part of the above embodiments can be described as, but not limited to, the following supplementary notes.

(Supplementary Note 1)

A second radio access network (RAN) node to be used in a radio communication system that supports a first RAT and a second RAT, the second RAN node being associated with the second RAT, the second RAN node comprising:

a memory; and at least one processor coupled to the memory and configured to send a radio resource configuration of the second RAT to a radio terminal via a first RAN node associated with the first RAT, wherein the radio resource configuration explicitly or implicitly indicates at least one numerology that is included in multiple numerologies supported by the second RAT and is different from a reference numerology.

(Supplementary Note 2)

The second RAN node according to Supplementary Note 1, wherein each numerology includes at least one of sub-carrier spacing, system bandwidth, a Transmission Time Interval length, subframe duration, slot duration, the number of slots per subframe, a Cyclic prefix length, symbol duration, and the number of symbols per subframe.

(Supplementary Note 3)

The second RAN node according to Supplementary Note 1 or 2, wherein the at least one processor is configured to generate the radio resource configuration for dual connectivity that uses the first RAT as a primary RAT and the second RAT as a secondary RAT.

(Supplementary Note 4)

The second RAN node according to Supplementary Note 3, wherein the at least one processor is configured to receive a radio bearer setup request from the first RAN node, select at least one numerology according to requirements for a radio bearer of the second RAT indicated by the radio bearer setup request, and include in the radio resource configuration an information element explicitly or implicitly indicating the selected at least one numerology.

(Supplementary Note 5)

The second RAN node according to Supplementary Note 1 or 2, wherein the at least one processor is configured to generate the radio resource configuration for an Inter-RAT handover of the radio terminal from the first RAT to the second RAT.

(Supplementary Note 6)

The second RAN node according to any one of Supplementary Notes 1 to 5, wherein the reference numerology defines a reference subframe configuration for a carrier that the second RAT supports.

(Supplementary Note 7)

The second RAN node according to any one of Supplementary Notes 1 to 6, wherein the at least one processor is configured to notify the first RAN node of the reference numerology in a setup procedure of an inter-base station interface between the first RAN node and the second RAN node.

(Supplementary Note 8)

The second RAN node according to Supplementary Note 6, wherein the at least one processor is configured to send to the radio terminal, via the first RAN node, a configuration for measurement on the carrier according to the reference numerology.

(Supplementary Note 9)

A first radio access network (RAN) node to be used in a radio communication system that supports a first RAT and a second RAT, the first RAN node being associated with the first RAT, the first RAN node comprising:
  a memory; and
  at least one processor coupled to the memory and configured to receive a radio resource configuration of the second RAT from a second RAN node associated with the second RAT and send the radio resource configuration to a radio terminal, wherein
  the radio resource configuration explicitly or implicitly indicates at least one numerology that is included in multiple numerologies supported by the second RAT and is different from a reference numerology.

(Supplementary Note 10)

The first RAN node according to Supplementary Note 9, wherein each numerology includes at least one of subcarrier spacing, system bandwidth, a Transmission Time Interval length, subframe duration, slot duration, the number of slots per subframe, a Cyclic prefix length, symbol duration, and the number of symbols per subframe, (Supplementary Note 11)

The first RAN node according to Supplementary Note 9 or 10, wherein the at least one processor is configured to receive the radio resource configuration from the second RAN node for dual connectivity that uses the first RAT as a primary RAT and the second RAT as a secondary RAT.

(Supplementary Note 12)

The first RAN node according to Supplementary Note 9 or 10, wherein the at least one processor is configured to receive the radio resource configuration from the second RAN node for an Inter-RAT handover of the radio terminal from the first RAT to the second RAT.

(Supplementary Note 13)

The first RAN node according to any one of Supplementary Notes 9 to 12, wherein the reference numerology defines a reference subframe configuration for a carrier that the second RAT supports.

(Supplementary Note 14)

The first RAN node according to Supplementary Note 13, wherein the at least one processor is configured to send, to the radio terminal, a configuration for measurement on the carrier according to the reference numerology.

(Supplementary Note 15)

The first RAN node according to any one of Supplementary Notes 9 to 13, wherein the at least one processor is configured to receive the reference numerology from the second RAN node in a setup procedure of an inter-base station interface between the first RAN node and the second RAN node.

(Supplementary Note 16)

A radio terminal to be used in a radio communication system that supports a first RAT and a second RAT, the radio terminal comprising:
  at least one wireless transceiver configured to communicate with a first radio access network (RAN) node associated with the first RAT and communicate with a second RAN node associated with the second RAT; and
  at least one processor configured to receive a radio resource configuration of the second RAT from the second RAN node via the first RAN node, wherein
  the radio resource configuration explicitly or implicitly indicates at least one numerology that is included in multiple numerologies supported by the second RAT and is different from a reference numerology, (Supplementary Note 17)

The radio terminal according to Supplementary Note 16, wherein each numerology includes at least one of subcarrier spacing, system bandwidth, a Transmission Time Interval length, subframe duration, slot duration, the number of slots per subframe, a Cyclic prefix length, symbol duration, and the number of symbols per subframe.

(Supplementary Note 18)

The radio terminal according to Supplementary Note 16 or 17, wherein the at least one processor is configured to receive the radio resource configuration for dual connectivity that uses the first RAT as a primary RAT and the second RAT as a secondary RAT.

(Supplementary Note 19)

The radio terminal according to Supplementary Note 16 or 17, wherein the at least one processor is configured to receive the radio resource configuration for an Inter-RAT handover of the radio terminal from the first RAT to the second RAT.

(Supplementary Note 20)

The radio terminal according to any one of Supplementary Notes 16 to 19, wherein the reference numerology defines a reference subframe configuration for a carrier that the second RAT supports.

(Supplementary Note 21)

A method for a second radio access network (RAN) node used in a radio communication system that supports a first RAT and a second RAT, the second RAN node being associated with the second RAT, the method comprising:

sending a radio resource configuration of the second RAT to a radio terminal via a first RAN node associated with the first RAT, wherein the radio resource configuration explicitly or implicitly indicates at least one numerology that is included in multiple numerologies supported by the second RAT and is different from a reference numerology.

(Supplementary Note 22)

A method for a first radio access network (RAN) node used in a radio communication system that supports a first RAT and a second RAT, the first RAN node being associated with the first RAT, the method comprising:

receiving a radio resource configuration of the second RAT from a second RAN node associated with the second RAT: and sending the radio resource configuration to a radio terminal, wherein the radio resource configuration explicitly or implicitly indicates at least one numerology that is included in multiple numerologies supported by the second RAT and is different from a reference numerology.

(Supplementary Note 23)

A method for a radio terminal used in a radio communication system that supports a first RAT and a second RAT, the method comprising:

receiving a radio resource configuration of the second RAT from a second radio access network (RAN) node associated with the second RAT via a first RAN node associated with the first RAT, wherein the radio resource configuration explicitly or implicitly indicates at least one numerology that is included in multiple numerologies supported by the second RAT and is different from a reference numerology.

(Supplementary Note 24)

A program for causing a computer to perform a method for a second radio access network (RAN) node used in a radio communication system that supports a first RAT and a second RAT, the second RAN node being associated with the second RAT, wherein the method comprises:

sending a radio resource configuration of the second RAT to a radio terminal via a first RAN node associated with the first RAT, wherein the radio resource configuration explicitly or implicitly indicates at least one numerology that is included in multiple numerologies supported by the second RAT and is different from a reference numerology.

(Supplementary Note 25)

A program for causing a computer to perform a method for a first radio access network (RAN) node used in a radio communication system that supports a first RAT and a second RAT, the first RAN node being associated with the first RAT, wherein the method comprises:

receiving a radio resource configuration of the second RAT from a second RAN node associated with the second RAT; and sending the radio resource configuration to a radio terminal, wherein the radio resource configuration explicitly or implicitly indicates at least one numerology that is included in multiple numerologies supported by the second RAT and is different from a reference numerology.

(Supplementary Note 26)

A program for causing a computer to perform a method for a radio terminal used in a radio communication system that supports a first RAT and a second RAT, wherein the method comprises:

receiving a radio resource configuration of the second RAT from a second radio access network (RAN) node associated with the second RAT via a first RAN node associated with the first RAT, wherein the radio resource configuration explicitly or implicitly indicates at least one numerology that, is included in multiple numerologies supported by the second RAT and is different from a reference numerology.

This application is based upon and claims the benefit of priority from Japanese Patent Application No. 2017-000798, filed on Jan. 5, 2017, the disclosure of which is incorporated herein in its entirety by reference.

REFERENCE SIGNS LIST 1 eNodeB (eNB)
2 gNodeB (gNB)
3 User Equipment (UE)
4 Evolved Packet Core (EPC)
5 Mobility Management Entity (MME)
7 5G Core Network (5G-CN)
1101 RF Transceiver
1104 Processor
1105 Memory
1201 RF Transceiver
1203 Baseband Processor
1204 Application Processor
1206 Memory

The invention claimed is:

1. A second radio access network (RAN) node to be used in a radio communication system that supports a first Radio Access Technology (RAT) and a second RAT, the second RAN node being associated with the second RAT, the second RAN node comprising:

a memory; and at least one processor coupled to the memory and configured to:

notify a first RAN node associated with the first RAT of a first numerology that is included in multiple numerologies, in a setup procedure of an inter-RAN node interface between the first RAN node and the second RAN node; and send a radio resource configuration of the second RAT to a radio terminal via the first RAN node, wherein the radio resource configuration indicates at least one second numerology, the first numerology corresponds to numerology of Synchronization Signal, and the at least one second numerology corresponds to numerology of other channels than Synchronization Signal.

2. The second RAN node according to claim 1, wherein each numerology includes at least one of subcarrier spacing, system bandwidth, a Transmission Time Interval length, subframe duration, slot duration, the number of slots per subframe, a Cyclic prefix length, symbol duration, and the number of symbols per subframe.

3. The second RAN node according to claim 1, wherein the at least one processor is configured to generate the radio resource configuration for dual connectivity that uses the first RAT as a primary RAT and the second RAT as a secondary RAT.

4. The second RAN node according to claim 3, wherein the at least one processor is configured to receive a radio bearer setup request from the first RAN node, select at least one numerology according to requirements for a radio bearer of the second RAT indicated by the radio bearer setup request, and include in the radio resource configuration an information element explicitly or implicitly indicating the selected at least one numerology.

5. The second RAN node according to claim 1, wherein the at least one processor is configured to generate the radio resource configuration for an Inter-RAT handover of the radio terminal from the first RAT to the second RAT.

6. The second RAN node according to claim 1, wherein the first numerology defines a subframe configuration for a carrier that the second RAT supports.

7. The second RAN node according to claim 6, wherein the at least one processor is configured to send to the radio terminal, via the first RAN node, a measurement configuration of at least one cell provided by the second RAN node on the carrier according to the first numerology.

8. A first radio access network (RAN) node to be used in a radio communication system that supports a first Radio Access Technology (RAT) and a second RAT, the first RAN node being associated with the first RAT, the first RAN node comprising:
a memory; and
at least one processor coupled to the memory and configured to:
receive a first numerology that is included in multiple numerologies, from a second RAN node associated with the second RAT, in a setup procedure of an inter-RAN node interface between the first RAN node and the second RAN node;
receive a radio resource configuration of the second RAT from the second RAN node; and
send the radio resource configuration to a radio terminal, wherein
the radio resource configuration indicates at least one second numerology,
the first numerology corresponds to numerology of Synchronization Signal, and
the at least one second numerology corresponds to numerology of other channels than Synchronization Signal.

9. The first RAN node according to claim 8, wherein the first numerology defines a subframe configuration for a carrier that the second RAT supports.

10. The first RAN node according to claim 9, wherein the at least one processor is configured to send, to the radio terminal, a measurement configuration of at least one cell provided by the second RAN node on the carrier according to the reference numerology.

11. A radio terminal to be used in a radio communication system that supports a first Radio Access Technology (RAT) and a second RAT, the radio terminal comprising:
at least one wireless transceiver configured to communicate with a first radio access network (RAN) node associated with the first RAT and communicate with a second RAN node associated with the second RAT; and
at least one processor configured to receive a radio resource configuration of the second RAT from the second RAN node via the first RAN node, wherein
a first numerology that is included in multiple numerologies is sent from the second RAN node to the first RAN node in a setup procedure of an inter-RAN node interface between the first RAN node and the second RAN node,
the radio resource configuration indicates at least one second numerology, the first numerology corresponds to numerology of Synchronization Signal, and
the at least one second numerology corresponds to numerology of other channels than Synchronization Signal.

12. The radio terminal according to claim 11, wherein each numerology includes at least one of subcarrier spacing, system bandwidth, a Transmission Time Interval length, subframe duration, slot duration, the number of slots per subframe, a Cyclic prefix length, symbol duration, and the number of symbols per subframe.

13. The radio terminal according to claim 11, wherein the at least one processor is configured to receive the radio resource configuration for dual connectivity that uses the first RAT as a primary RAT and the second RAT as a secondary RAT.

14. The radio terminal according to claim 11, wherein the at least one processor is configured to receive the radio resource configuration for an Inter-RAT handover of the radio terminal from the first RAT to the second RAT.

15. The radio terminal according to claim 11, wherein the first numerology defines a subframe configuration for a carrier that the second RAT supports.

16. A method for a second radio access network (RAN) node used in a radio communication system that supports a first Radio Access Technology (RAT) and a second RAT, the second RAN node being associated with the second RAT, the method comprising:
notifying a first RAN node associated with the first RAT of a first numerology that is included in multiple numerologies, in a setup procedure of an inter-RAN node interface between the first RAN node and the second RAN node; and
sending a radio resource configuration of the second RAT to a radio terminal via the first RAN node, wherein
the radio resource configuration explicitly or implicitly indicates at least one second numerology,
the first numerology corresponds to numerology of Synchronization Signal, and
the at least one second numerology corresponds to numerology of other channels than Synchronization Signal.

17. A method for a first radio access network (RAN) node used in a radio communication system that supports a first Radio Access Technology (RAT) and a second RAT, the first RAN node being associated with the first RAT, the method comprising:
receiving a first numerology that is included in multiple numerologies, from a second RAN node associated with the second RAT, in a setup procedure of an inter-RAN node interface between the first RAN node and the second RAN node;
receiving a radio resource configuration of the second RAT from the second RAN node; and
sending the radio resource configuration to a radio terminal, wherein
the radio resource configuration indicates at least one second numerology,
the first numerology corresponds to numerology of Synchronization Signal, and
the at least one second numerology corresponds to numerology of other channels than Synchronization Signal.

18. A method for a radio terminal used in a radio communication system that supports a first Radio Access Technology (RAT) and a second RAT, the method comprising:
receiving a radio resource configuration of the second RAT from a second radio access network (RAN) node associated with the second RAT via a first RAN node associated with the first RAT, wherein a first numerology that is included in multiple numerologies is sent from the second RAN node to the first RAN node in a setup procedure of an inter-RAN node interface between the first RAN node and the second RAN node, and the radio resource configuration indicates at least one second numerology different from the reference numerology, the first numerology corresponds to numerology of Synchronization Signal, and the at least one second numerology corresponds to numerology of other channels than Synchronization Signal.

* * * * *